Patented May 16, 1944

2,349,061

UNITED STATES PATENT OFFICE 2,349,061

PREPARATION OF MONOALKYLOL CYANAMIDE CONDENSATION PRODUCTS

Robert F. Uncles, Stamford, and Kerwin K. Kurtz, Old Greenwich, Conn., assignors to American Cyanamid Company, New York, N. Y., a corporation of Maine No Drawing. Application March 24, 1942, Serial No. 435,949

4 Claims. (Cl. 260—249.5)

This invention relates to a new and improved method of preparing surface-active agents by condensing an aliphatic monocarboxylic acid with an alkylol cyanamide.

In the U. S. Patent to W. P. Ericks, No. 2,258,-320, dated October 7, 1941, it is disclosed that condensation products of an aliphatic monocarboxylic acid with an alkylol cyanamide may be prepared and that such condensation products have surface active properties. These products are useful for a wide variety of purposes as wetting agents, emulsifying agents, detergents, plasticizers for soaps, softening of textile fabrics, of wool, cotton, rayon, etc., as demulsification agents for oil emulsions, as cationic flotation agents, as dye dispersants, in the formulation of printing inks, fatliquoring of leather and the like.

In accordance with the disclosure of that patent alkylol cyanamides are first prepared in substantially anhydrous form and then reacted with a suitable aliphatic monocarboxylic acid at temperatures within the range 110-160° C. The alkylol cyanamides may be prepared in several ways, the preferred method being to react sodium cyanamide or other suitable cyanamide compound in aqueous solution with one or more moles of an alkylene oxide such as ethylene oxide, propylene oxide, the methyl, ethyl or propyl ether of ethylene glycol and the like or with compounds containing such groups as 5,6-anhydro-monoacetone glucose. These monoalkylol cyanamide compounds may be represented by the formula NC.NH.ROH in which R is either an alkyl or an alkoxyalkyl radical, depending on whether one or several moles of alkylene oxide were reacted with each mole of cyanamide.

In that patent it was stated that when an alkylol cyanamide and an aliphatic monocarboxylic acid are simply mixed without heating a product is obtained which is probably a salt of the acid. On the other hand, it was stated, upon heating the mixture within the range of 110-160° C. a further condensation takes place with evolution of water resulting in the surface-active condensation products of the invention. Since the preparation of monoalkylol cyanamides is conducted in the presence of large quantities of water, the reaction mixture containing ordinarily about 40% by weight of monoalkylol cyanamide, it was thought necessary to remove substantially all of the water before reacting it with the fatty acid at temperatures within the range 110-160 C.

The monoalkylol cyanamides polymerize readily, however, and it was necessary to remove the excess water by evaporation at low temperatures under reduced pressures of 10-20 mm. of mercury. Failure to observe these conditions resulted in the formation of complex polymerization products which either did not react with the fatty acid in the subsequent condensation or gave salts and other reaction products having inferior surface-active properties. As indicated in the patent the formation of the dimer, $(NC.NH.ROH)_2$, takes place readily and is probably essential to the formation of the final surface active product. On the other hand formation of the trimer may also take place by direct polymerization of three moles of monoalkylol cyanamide or by the reaction of one mole of monoalkylol cyanamide with one mole of dialkylol dicyandiamide. Such a product, trialkylol isomelamine, is a closed ring structure offering no chance for reaction with monocarboxylic fatty acids except through the formation of a salt. The —OH groups present in the trialkylol isomelamine are quite active and may split off combining with a hydrogen attached to a nitrogent atom of another molecule of the isomelamine, with the formation of water and the linkage of two high molecular weight closed ring isomelamine residues. These products tend to form hard, glassy resinous bodies useless in the production of surface-active agents. Other complex polymerization and reaction products may also be postulated and no doubt are formed in the product during the dehydration step.

In accordance with the present invention we have found that the condensation between monoalkylol cyanamides and monocarboxylic fatty acids may be carried out in a much simpler, faster and more efficient way while at the same time avoiding the formation of unduly large amounts of the high molecular weight polymeric structures resulting from the extended heating required in the dehydration of the aqueous monoalkylol cyanamides and which also form during the reaction with monocarboxylic fatty acids at high temperatures of the order of 110-160° C. These objects and others which will appear hereinafter are attained by us by omitting the step of dehydrating the aqueous monoalkylol cyanamide reaction product, mixing the aqueous solution thereof with an monocarboxylic fatty acid and reacting and dehydrating the mixture at much lower temperatures within the range of 80-100° C.

Our improved process will now be illustrated by means of the following examples which, how-

Example 1

115 pounds of a commercial grade of lauric acid (Neofat #11) was placed in a 50 gallon glass-lined evaporator and brought to a molten state at 81° C. An aqueous solution of monoethylol cyanamide containing 40% by weight of monoethylol cyanamide was then slowly added to the molten lauric acid with stirring until the equivalent of 100 pounds of 100% monoethylol cyanamide had been added. Because of the tendency of the reaction mixture to foam the monoethylol cyanamide solution was added cautiously. When all of the aqueous monoethylol cyanamide had been added the reaction mixture was brown colored and quite gelatinous. Dehydration was then carried on with constant agitation at 97° C. until the batch had become liquid and calculations showed that all of the water had been removed. A 0.1% aqueous solution of the product gave a wetting time of 39 seconds as measured by the Draves wetting test.

Example 2

20 parts by weight of lauric acid were dissolved in ethyl alcohol at 60° C. and 45 parts by weight of monoethylol cyanamide in the form of a 38.4% aqueous solution was then added with stirring. In this preparation no foaming was encountered and the aqueous monoethylol cyanamide was added more rapidly than in the case of Example 1. The batch was then heated between 80–100° C. until the alcohol and water were evaporated. The product, a clear liquid, gave a wetting time by the Draves test of 38.9 seconds at a concentration of 1 gram per liter.

Example 3

To show the effects of continued heating at temperatures below 100° C. during the dehydration of the product, samples of the reaction product described in Example 1 were taken after dehydration periods of 2½, 4½ and 5½ hours at 97° C. and the product measured for detergency, foaming characteristics and wetting power. The results of these tests are shown in the following table:

Table I

| Sample | Detergency | Foaming | Draves test wetting time |
|---|---|---|---|
| | | | Secs./gram/liter |
| After 2½ hours dehydration, solids content 88.5%. | Good | Very good | 40.9 |
| After 3½ hours dehydration, solids content 99%. | ---do--- | ---do--- | 41.3 |
| After 5½ hours, temp. 97°C. | ---do--- | ---do--- | 42.9 |

As will be noted continued heating at temperatures below 100° C. during dehydration causes very little deterioration in the product.

Example 4

A sample of the reaction mixture described in Example 1 was heated to 130° C. for 30 minutes and the product examined for detergency, foaming characteristics and wetting power. The results are shown in the following table:

Table II

| Sample | Detergency | Foaming | Draves test wetting time |
|---|---|---|---|
| | | | Secs./gram/liter |
| Taken to 130° C. for 30 minutes. | Good | Fair | 62.8 |

As will be observed from these results heating of the reaction mixture during the dehydration step at temperatures much in excess of 100° C. result in a marked deterioration in the surface active characteristics of the product.

Since it is desirable in some cases to prepare and market the surface-active agents containing appreciable quantities of water and because of the great differences in the efficiency of evaporating equipment it is not feasible to set any particular time required for dehydrating the material. The condensation between the monocarboxylic fatty acid and the monoalkylol cyanamide proceeds rather rapidly under the conditions of our process and ordinarily heating the two reactants together for ½ hour is sufficient to bring about the reaction and prepare a marketable product. On the other hand when preparing large batches of the material in poorly designed evaporating equipment we have been obliged to heat the reaction mixture between 80–100° C. for 20 hours to assure complete dehydration. Even under these conditions, however, we have found the product to be highly satisfactory and free from excess polymerization products.

We may employ any of the aqueous solutions of the various alkylol cyanamides such as monoethylol cyanamide, monoethoxy ethylol cyanamide, triethoxy ethylol cyanamide, mono-isobutylol cyanamide, mono-n-butylol cyanamide, mono-2,3-dihydroxy propyl cyanamide, mono-2-hydroxy-3-chloro propyl cyanamide and other alkylol cyanamides of this type since all of these which we have tried gave satisfactory products of the same general characteristics and we know of no reason why any aqueous solution of an unpolymerized alkylol cyanamide may not be employed in our reaction. As pointed out hereinbefore these alkylol cyanamides are ordinarily prepared by known methods in the form of aqueous solutions and it is an important advantage of our invention that we may employ these aqueous solutions directly in the condensation reaction without preliminary removal of water as heretofore deemed necessary. Monoalkylol cyanamides as ordinarily prepared contain amounts varying from 20 to 60% of the alkylol cyanamide product and our invention contemplates the use of aqueous solutions containing these amounts of monoalkylol cyanamides.

A large number of different aliphatic monocarboxylic acids may be employed as reactants in the condensation with aqueous monoalkylol cyanamides in our process, including those such as butyric acid, caproic acid, lauric acid, stearic acid, palmitic acid, oleic acid, and fatty acid mixtures obtained by the hydrolysis of fish, animal and vegetable fats and oils. We prefer, however, those having long alkyl chain containing 10 to 16 carbon atoms since these acids yield condensation products of greatest surface activity. Although we ordinarily employ approximately two moles of the monoalkylol cyanamide for each mole of monocarboxylic acid in our process we may if desired employ a small excess of either reactant without harm to the final product.

What we claim is:

1. A method of preparing surface-active aliphatic monocarboxylic acid-monoalkylol cyanamide condensation products which comprises heating together an aliphatic monocarboxylic acid having at least 4 carbon atoms with an aqueous solution of a monoalkylol cyanamide at temperatures within the range 80–100° C.

2. A method of preparing surface-active aliphatic monocarboxylic acid-monoalkylol cyanamide condensation products which comprises heating together an aliphatic monocarboxylic acid having from 10 to 16 carbon atoms with an aqueous solution containing 20–60% by weight of a substantially monomeric monoalkylol cyanamide at temperatures within the range 80–100° C.

3. A method of preparing surface-active aliphatic monocarboxylic acid-monoalkylol cyanamide condensation products which comprises heating together lauric acid with an aqueous solution of monoethylol cyanamide at temperatures within the range 80–100° C.

4. A method of preparing surface-active monocarboxylic acid-alkylol cyanamide condensation products which comprises heating together an aliphatic monocarboxylic acid having at least 4 carbon atoms with an aqueous solution containing 20–60% by weight of an alkylol cyanamide of the formula $(NCNHROH)_y$ in which R is a member of the group consisting of alkyl and alkoxyalkyl radicals and $y$ is a small whole number less than 3 at temperatures within the range 80–100° C.

ROBERT F. UNCLES.
KERWIN K. KURTZ.